Aug. 20, 1968   C. W. HIGHBERG   3,397,493
SURFACING APPARATUS
Filed Dec. 9, 1964
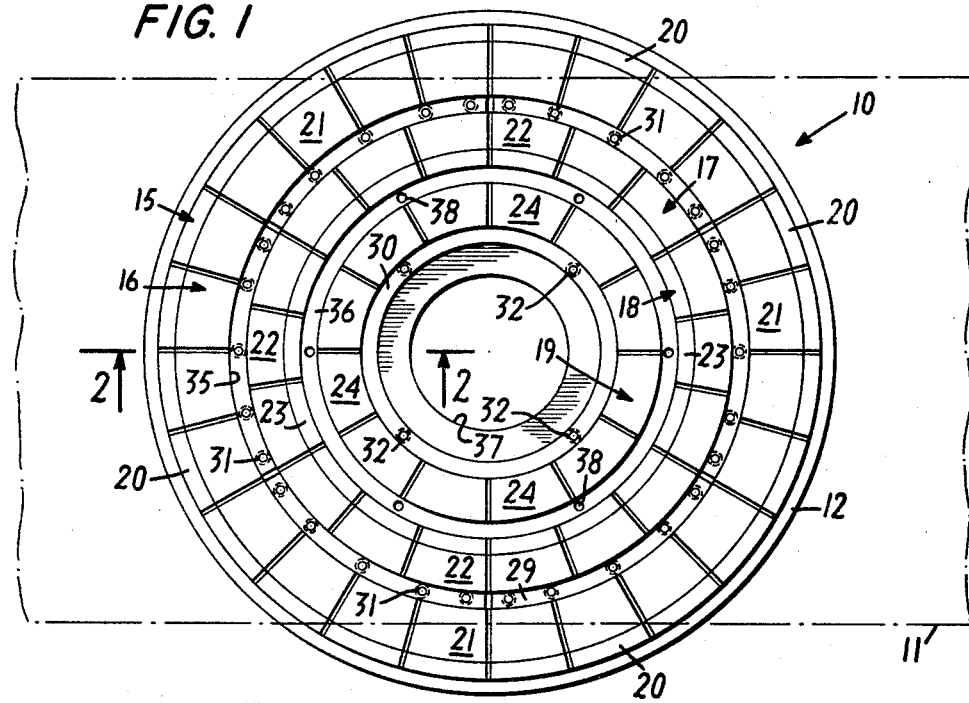
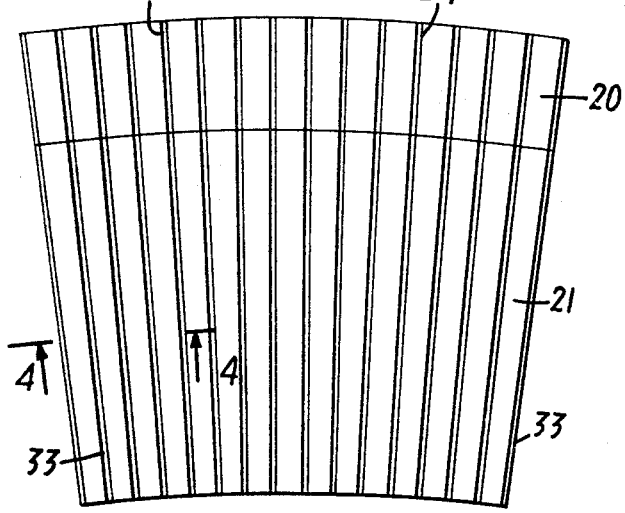
INVENTOR.
CARLE W. HIGHBERG
BY
his ATTORNEYS

3,397,493
SURFACING APPARATUS
Carle W. Highberg, Murray Hill, N.J., assignor to Engelhard Hanovia, Inc., Newark, N.J., a corporation of New Jersey
Filed Dec. 9, 1964, Ser. No. 417,065
7 Claims. (Cl. 51—356)

ABSTRACT OF THE DISCLOSURE

Apparatus including a grinding wheel having a plurality of concentric fixed abrasive annular grinding means having abrasive particles bonded therein in respective predetermined concentrations and having substantially coplanar grinding faces wherein the outermost one of the concentric grinding means has a materially lower concentration than the next adjacent radially inward one of the concentric grinding means or wherein the degree of concentration of adjacent concentric grinding means varies in a predetermined progressive relation from the radially outermost concentric grinding means.

---

The present invention relates to apparatus for the surfacing of hard materials, such as flat sheets of glass and the like, and, more particularly, to novel and improved apparatus for materially increasing the efficiency of the surfacing operation.

As described in detail in my copending application, Ser. No. 293,601, filed July 9, 1963, now United States Patent No. 3,243,922, dated Apr. 5, 1966, and any other earlier copending applications referred to therein, substantial reductions in capital equipment and operating cost, and substantial improvement in production quality in the surfacing of flat sheets of glass and the like have been obtained through the use of surfacing apparatus employing bonded abrasive particles, such as diamonds, of predetermined concentration and particle size, in accordance with the various techniques disclosed therein.

It has been found during the continued development of these techniques and in commercial production employing them that when two identical grinding wheels having bonded diamond particles of the same concentration and particle size are placed in successive relation in a grinding line, the effective glass removal obtained by the second wheel has sometimes been substantially less than that obtained by the first of the two identical wheels. It has also been found that under certain grinding conditions with a grinding wheel having diamond particles of uniform particle size and uniform concentration across the complete grinding face, glass removal could not be increased byond an amount less than what was required or otherwise normally to be expected even when the grinding wheel was loaded to a practical maximum consonant with the structural limitations of the apparatus.

As a result of a further study of the operation of how the grinding wheel accomplishes its work function in an effort to overcome the aforementioned operating limitations, it was found that there was a direct relation between the amount of work done and the pressure that could be exerted by the grinding face upon the work surface. Further, it was found to be desirable to maintain constant the number of particles contacting the work piece per unit time, as may be accomplished by the application of the following inventive principles.

For example, in one grinding station having a grinding wheel constructed in accordance with my previously developed techniques, where it was expected that the glass removal would be in the order of .010 inch, it was not possible even with a maximum load of some 6,000 lbs. to obtain a glass removal of greater than .005 inch, while a minimum removal of .006 inch was required. However, when an otherwise comparable grinding wheel having concentrations and particle sizes for different concentric grinding means selected in accordance with the principles of the invention as described hereinafter was substituted at that grinding station, the requisite amount of glass removal was obtained with a load of only 3,750 lbs.

In accordance with the invention, a novel and improved construction of grinding wheel having multiple concentric annular grinding means with different predetermined concentrations and particle sizes has provided a substantial increase in stock removal under materially lower load conditions without creating greater depth of fracture. In particular, the improved grinding wheel comprises two or more concentric, fixed abrasive, annular grinding means having abrasive particles, for example diamond particles, bonded therein in respective predetermined concentrations and having substantially coplanar grinding faces. At least the outermost one of the concentric grinding means has a materially lower concentration than the next adjacent radially inward one of the concentric grinding means. In some embodiments, the grinding wheel is so constructed that the degree of concentration of adjacent concentric grinding means varies or increases in a predetermined progressive relation from the radially outermost concentric grinding means. Further, in some cases it is desirable that at least the outermost one of the concentric grinding means includes abrasive particles of a materially larger particle size than a radially inward one of the grinding means.

For a more complete understanding of the invention, reference may be had to the following detailed description taken in conjunction with the accompanying figures of the drawing in which:

FIGURE 1 is a plan view of an exemplary embodiment depicting the concentric annular grinding means in surfacing relation to the work surface, in accordance with the invention;

FIG. 2 is a partial radial section of the annular grinding faces of the concentric grinding means of the wheel in FIG. 1, taken along the line 2—2 and looking in the direction of the arrows;

FIG. 3 is a plan view of a grinding segment forming a portion of two adjacent concentric grinding means of the wheel in FIG. 1; and FIG. 4 is a partial sectional view of the grinding segment of FIG. 3, taken along the line 4—4 and looking in the direction of the arrows.

In the disclosed exemplary embodiment, a grinding wheel 10 is positioned in grinding relation to a work surface 11, such as a flat sheet of glass adapted to be carried through the grinding station with its exposed surface lying in a plane parallel to the grinding faces of the wheel 10.

The grinding wheel 10 includes an annular metallic plate 12 having a plurality of concentric grinding means mounted on one face thereof. In the disclosed wheel there are five concentric grinding means 15, 16, 17, 18 and 19, respectively, each having a plurality of contiguous arcuate segments 20, 21, 22, 23 and 24, respectively. The arcuate segments 20 and 21 forming the concentric grinding means 15 and 16 are adapted to lie contiguous and be secured to a segment holder 26. The segments 22 and 23 forming the concentric grinding means 17 and 18 are contiguously mounted and secured on a segment holder 27. The segments 24 forming the grinding means 19 are mounted on and secured to a segment holder 28. The respective grinding means including the segment holders 26, 27 and 28 are secured by means of suitable concentric locking strips 29 and 30 and a plurality of angularly displaced bolts 31 and 32 to the plate 12.

Each of the arcuate segments 20, 21, 22, 23 and 24 comprises a suitable matrix having a predetermined concentration of abrasive grits of predetermined particle size bonded therein. Furthermore, as shown for example in FIGS. 3 and 4, each of the arcuate segments 20, 21, 22, 23 and 24 has a plurality of uniformly spaced radial grooves formed therein, e.g., the grooves 34 for segment 20 and the grooves 33 for the segment 21. Each of the radial grooves in the segments 20 and 21 constituting the concentric grinding means 15 and 16 communicates with a concentric groove 35, which also serves to space apart adjacent segments 21 and 22. Each of the radial grooves of the segments 22 and 23 forming the concentric grinding means 17 and 18 communicates with the concentric groove 35 and a radially-inward concentric groove 36, the latter groove 36 serving to separate the arcuate segments 23 and 24 of the grinding means 18 and 19. Each of the radial grooves in the arcuate segments 24 forming the concentric grinding means 19 communicates with the concentric groove 36 and the central area of the grinding wheel 10 leading to a passageway 37.

In a preferred embodiment of the invention, the arcuate segments 20 forming the outermost annular grinding means 15 have a radial dimension of 1.5 inches, lying between 31 and 29.5 inches from the axis of the grinding wheel 10. The radial dimension of the next contiguous segments 21 is 6.5 inches, with the segments lying between 29.5 and 23 inches from the grinding wheel axis. The concentric groove 35 has a radial dimension of one inch. The segments 22 of the grinding means 17 have a radial dimension of 4.5 inches lying between 22 and 17.5 inches from the wheel axis. The next contiguous segments 23 of the grinding means 18 have a radial dimension of 1.5 inches lying between 17.5 and 16 inches from the wheel axis. The concentric groove 36 has a radial dimension of one inch. The segments 24 forming the grinding means 19 have a radial dimension of five inches lying between 15 and 10 inches from the axis of the grinding wheel 10.

Coolant of any suitable concentration, such as 25 parts of water to one part of oil and emulsifier, may be supplied to the grinding wheel 10 in any conventional manner such as through means including the passageway 37 formed in the plate 12 and one or more apertures 38 passing in a slantwise fashion through the plate 12 to the concentric groove 36 to facilitate through the action of centrifugal force the intromissive flow of coolant across the grinding faces of grinding means 15, 16, 17, 18 and 19, through the intercommunicating radial grooves, the concentric groove 35, and any other suitable grooves or channels that may be formed therein.

In accordance with the invention, the abrasive particles, preferably diamond particles, bonded in the matrices forming the arcuate segments 20 of the grinding means 15 have a materially lower concentration than those of the next adjacent radially-inward grinding means 16. Similarly, when there are more than two concentric grinding means the relationship of the concentration in the grinding means 16 to that of the grinding means 17, 18 and 19, for example, may be selected to vary in a predetermined progressive relation from that of the radially outermost concentric grinding means 15, in order to maintain substantially constant the number of diamond particles contacting the work surface in any radial position per unit time. In one preferred exemplary embodiment having structural dimensions as set forth above with respect to FIG. 1, the degree of concentration increases progressively from the radially outermost grinding means 15 to the innermost grinding means 19, as shown by the following table:

TABLE I

| Concentric Grinding Means | Concentration (carats per cubic inch) | Particle Size |
| --- | --- | --- |
| 15 | .3 | 270–325 grit (U.S.).* |
| 16 | .375 | 20–35 microns. |
| 17 | .56 | 20–35 microns. |
| 18 | .75 | 20–35 microns. |
| 19 | 1.1 | 20–35 microns. |

* 270–325 grit is equivalent to 44–53 microns.

As indicated in the above table, the particle size of the diamond particles in the exemplary embodiment of the outermost grinding means 15 may also be materially larger than the remaining radially inward grinding means 16, 17, 18 and 19.

Thus there is provided in accordance with the invention a novel and improved construction of grinding wheel having a plurality of concentric grinding means of different predetermined concentrations and particle sizes capable of substantially increasing the degree and efficiency of stock removal in the surfacing of hard materials such as plate glass without the creation of greater depth of fracture and within reasonable load conditions.

It will be obvious to those skilled in the art that the above-described embodiment is meant to be merely exemplary and that it is susceptible of modification and variation without departing from the spirit and scope of the invention. For example, while the embodiment utilizes five concentric grinding means or rings, in some cases, two, three or four concentric grinding means may satisfactorily perform the requisite grinding function. In fact, for heavier stock removal, the use of abrasive particles of a larger particle size and in heavier concentrations, such as particles in the range of 70 to 80 grit and in concentrations in the order of one to three carats per cubic inch, has proven highly satisfactory. Therefore, the invention is not deemed to be limited except as defined in the appended claims.

I claim:

1. A grinding wheel, comprising a plurality of concentric, fixed abrasive, annular grinding means having abrasive particles bonded therein in respective predetermined concentrations and having substantially coplanar grinding faces, at least the outermost one of said concentric grinding means having a materially lower concentration than the next adjacent radially inward one of said concentric grinding means.

2. A diamond grinding wheel, comprising a plurality of concentric, fixed abrasive, annular grinding means having diamond particles bonded therein in respective predetermined concentrations and having substantially coplanar grinding faces, the radially outermost of said plurality of grinding means having a first concentration, and the next adjacent radially inward one of said plurality of grinding means having a materially higher concentration.

3. A diamond grinding wheel, comprising a plurality of concentric, fixed abrasive, annular grinding means having diamond particles bonded therein in respective predetermined uniform concentrations and having substantially coplanar grinding faces, the degree of concentration of adjacent concentric grinding means varying in a predetermined progressive relation from the radially outermost concentric grinding means.

4. A diamond grinding wheel, comprising a plurality of concentric, fixed abrasive, annular grinding means having diamond particles bonded therein in respective predetermined uniform concentrations and having substantially coplanar grinding faces, the degree of concentration of adjacent ones of said concentric grinding means increasing in a predetermined progressive relation from the radially outermost concentric grinding means.

5. A diamond grinding wheel, comprising a plurality of concentric, fixed abrasive, annular grinding means having diamond particles bonded therein in respective predetermined concentrations and particle sizes and having substantially coplanar grinding faces, the degree of concentration of adjacent concentric grinding means varying in a predetermined progressive relation from the radially outermost concentric grinding means, and at least the outermost one of said concentric grinding means including diamond particles of a materially larger particle size than a radially inward one of said concentric grinding means.

6. A diamond grinding wheel, comprising a plurality of concentric, fixed abrasive, annular grinding means having diamond particles bonded therein in respective predetermined uniform concentrations and particle sizes and having substantially coplanar grinding faces, the degree of concentration of adjacent ones of said concentric grinding means increasing in a predetermined progressive relation from the radially outermost concentric grinding means, and the outermost one of said concentric grinding means including diamond particles of a materially larger particle size than the diamond particles of the remaining radially inward ones of said concentric grinding means.

7. A diamond grinding wheel, comprising a plurality of concentric, fixed abrasive, annular grinding means having diamond particles bonded therein in respective predetermined uniform concentrations and particle sizes, and having substantially coplanar grinding faces, the degree of concentration of adjacent ones of said concentric grinding means increasing in a predetermined progressive relation from the radially outermost concentric grinding means, the outermost one of said concentric grinding means including diamond particles of a materially larger particle size than the remaining radially inward ones of said concentric grinding means, each of said concentric grinding means having a plurality of uniformly spaced radial grooves formed therein, and at least two adjacent ones of said concentric grinding means being radially spaced apart by a concentric groove, and means for introducing coolant for intromissive flow across said coplanar grinding faces.

References Cited
UNITED STATES PATENTS

| | | | |
|---|---|---|---|
| 550,300 | 11/1895 | Sturtevant | 241—298 |
| 927,164 | 7/1909 | Puffer. | |
| 1,692,635 | 11/1928 | Drake | 51—209 |
| 2,867,063 | 1/1959 | Metzger | 51—209 |
| 3,282,269 | 11/1966 | Christensen | 51—267 X |

ROBERT C. RIORDON, *Primary Examiner.*

D. G. KELLY, *Assistant Examiner.*

UNITED STATES PATENT OFFICE
CERTIFICATE OF CORRECTION

Patent No. 3,397,493                               August 20, 1968

Carle W. Highberg

It is certified that error appears in the above identified patent and that said Letters Patent are hereby corrected as shown below:

Column 1, line 31, "any" should read -- my --. Column 3, line 75, after "position" insert -- of --. Column 6, line 22, "3,282,269" should read -- 3,282,263 --.

Signed and sealed this 20th day of January 1970.

(SEAL)
Attest:

Edward M. Fletcher, Jr.                      WILLIAM E. SCHUYLER, JR.
Attesting Officer                                  Commissioner of Patents